US012292821B2

(12) United States Patent
Xiao et al.

(10) Patent No.: US 12,292,821 B2
(45) Date of Patent: May 6, 2025

(54) VIDEO MEMORY MANAGEMENT METHOD, APPARATUS, DEVICE AND SYSTEM

(71) Applicant: ALIBABA GROUP HOLDING LIMITED, Grand Cayman (KY)

(72) Inventors: Wengcong Xiao, Hangzhou (CN); Shiru Ren, Beijing (CN); Yong Li, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 18/306,636

(22) Filed: Apr. 25, 2023

(65) Prior Publication Data

US 2023/0297498 A1    Sep. 21, 2023

Related U.S. Application Data

(63) Continuation of application No. PCT/CN2021/127856, filed on Nov. 1, 2021.

(30) Foreign Application Priority Data

Nov. 3, 2020  (CN) .......................... 202011219652.6

(51) Int. Cl.
*G06F 12/02* (2006.01)
*G06N 3/08* (2023.01)

(52) U.S. Cl.
CPC ............. *G06F 12/023* (2013.01); *G06N 3/08* (2013.01)

(58) Field of Classification Search
None
See application file for complete search history.

(56) References Cited

U.S. PATENT DOCUMENTS 10,733,090 B1 *  8/2020  Larsson .............. G06F 12/0284
2003/0056076 A1 *  3/2003  Cook .................... G06F 9/5022
                                                                   711/159

(Continued)

FOREIGN PATENT DOCUMENTS

CN    109766183 A    5/2019
CN    109828833 A    5/2019

(Continued)

OTHER PUBLICATIONS

European Patent Office Communication issued for Application No. 21888512.7 the Supplementary European Search Report (Art. 153(7) EPC) and the European search opinion dated Jul. 21, 2023, 10 pages.

(Continued)

*Primary Examiner* — Kaushikkumar M Patel
(74) *Attorney, Agent, or Firm* — Finnegan, Henderson, Farabow, Garrett & Dunner, LLP

(57) ABSTRACT

A video memory management method is provided. The method includes: determining priorities of a plurality of machine learning tasks executed by a graphics processing unit; if video memory resources are to be allocated for a higher-priority task, and an amount of allocatable video memory resources is smaller than an amount of video memory resources required by the higher-priority task, releasing at least a part of video memory resources occupied by a lower-priority task; and allocating video memory resources to the higher-priority task, wherein the higher-priority task is executed at least according to tensor data in a video memory space.

17 Claims, 5 Drawing Sheets

(56) References Cited

U.S. PATENT DOCUMENTS

| | | | | |
|---|---|---|---|---|
| 2012/0179882 A1* | 7/2012 | Bernhard, III | ........ | G06F 9/5022 |
| | | | | 711/171 |
| 2012/0260058 A1* | 10/2012 | Matsuzaki | ............ | G06F 9/5022 |
| | | | | 711/171 |
| 2013/0332942 A1* | 12/2013 | Ramesh | ................ | G06F 9/5016 |
| | | | | 719/318 |
| 2016/0335169 A1* | 11/2016 | Bhattacharyya | .... | G06F 11/3608 |
| 2017/0083258 A1* | 3/2017 | Miyamoto | ............ | G06F 3/0631 |
| 2019/0286991 A1* | 9/2019 | Lee | ........................... | G06T 1/60 |
| 2019/0302874 A1* | 10/2019 | Yamamoto | ............ | G06F 1/3228 |
| 2020/0081741 A1* | 3/2020 | Mitsugi | ................. | G06F 12/126 |
| 2020/0379810 A1* | 12/2020 | Dalmia | ................. | G06F 9/5016 |

FOREIGN PATENT DOCUMENTS

| | | |
|---|---|---|
| CN | 111078395 A | 4/2020 |
| CN | 111400022 A | 7/2020 |
| CN | 111768006 A | 10/2020 |
| KR | 102086757 B1 | 3/2020 |
| WO | WO2022095815 A1 | 5/2022 |

OTHER PUBLICATIONS

Mittal et al., "A survey of techniques for optimizing deep learning on GPUs," Journal of Systems Architecture, 99: 31 pages, 2019.

\* cited by examiner

VIDEO MEMORY MANAGEMENT METHOD, APPARATUS, DEVICE AND SYSTEM

CROSS-REFERENCE TO RELATED APPLICATIONS

The present disclosure claims the benefits of priority to International Application No. PCT/CN2021/127856, filed on Nov. 1, 2021, which claims the benefits of priority to Chinese Application No. 202011219652.6, filed on Nov. 3, 2020, both of which are incorporated herein by reference in their entireties.

TECHNICAL FIELD

The present disclosure relates to a technical field of machine learning, and in particular relates to a video memory management method, apparatus and system, a machine learning system, and an electronic device.

BACKGROUND

With the continuous development of deep learning algorithms and the support of the computing power of a graphics processing unit (GPU), deep learning has become a vital part of an enterprise product data flow. In order to support large-scale deep learning applications, an enterprise usually build a shared GPU cluster to support the development of products across a plurality of fields, such as computer vision, natural language processing, speech recognition, recommendation and advertising services, etc.

In order to improve a utilization rate of GPU resources and throughput of the entire GPU cluster, the deep learning system allows a plurality of deep learning tasks to be executed simultaneously on one GPU, so that more deep learning training tasks can be completed with the same amount of resources. At present, a typical method for reusing GPU memory resources is that video memory management is performed by a unified video memory allocator in a deep learning framework; when the allocator receives an application for video memory resources from any task, as long as a GPU executing the task has idle video memory resources, a corresponding video memory space is allocated to the task, regardless of video memory resource requirements of other tasks that are simultaneously executed on the GPU. Such processing method may speed up a small-batch training speed of the tasks.

However, these processing methods have several technical problems: 1) The foregoing method for reusing resources does not provide any performance isolation guarantee, which will bring uncontrollable mutual influence between the plurality of tasks. Specifically, when the GPU is allocated to a "resource guarantee" task for separate use, a deep learning system may guarantee task training performance thereof. Due to the lack of a performance isolation mechanism of the GPU, if there are other tasks that are executed together on such GPU, potential competition for video memory resources may lead to serious performance degradation of the "resource guarantee" task. 2) With the proceeding of training, GPU video memory requirements of the "resource guarantee" task may suddenly increase, and if a GPU video memory is occupied by other tasks at this time, the "resource guarantee" task fails, which is even more unacceptable. To sum up, how to manage the shared video memory resources of the machine learning system, so as to improve the utilization rate of the GPU cluster under the premise of guaranteeing the usage of the video memory resources of the higher-priority task, has become an urgent problem for those skilled in the art.

SUMMARY OF THE DISCLOSURE

The present disclosure provides a video memory management method to solve the problem that the performance of a higher-priority task cannot be guaranteed in the prior art. The present disclosure further provides a video memory management apparatus and system, a machine learning system, and an electronic device.

Embodiments of the present disclosure provide a video memory management method. The method includes: determining priorities of a plurality of machine learning tasks executed by a graphics processing unit; if video memory resources are to be allocated for a higher-priority task, and an amount of allocatable video memory resources is smaller than an amount of video memory resources required by the higher-priority task, releasing at least a part of video memory resources occupied by a lower-priority task; and allocating video memory resources to the higher-priority task, wherein the higher-priority task is executed at least according to tensor data in a video memory space.

Embodiments of the present disclosure provide an electronic device for performing a video memory management method. The electronic device includes a memory configured to store instructions; and one or more processors configured to execute the instructions to cause the electronic device to perform: determining priorities of a plurality of machine learning tasks executed by a graphics processing unit; if video memory resources are to be allocated for a higher-priority task, and an amount of allocatable video memory resources is smaller than an amount of video memory resources required by the higher-priority task, releasing at least a part of video memory resources occupied by a lower-priority task; and allocating video memory resources to the higher-priority task, wherein the higher-priority task is executed at least according to tensor data in a video memory space.

Embodiments of the present disclosure provide a video memory management system, including a storage resource coordinator and a plurality of storage resource allocators. The storage resource coordinator is configured to determine priorities of a plurality of machine learning tasks that are executed by a graphics processing unit; and if video memory resources are to be allocated for a higher-priority task, and an amount of allocatable video memory resources is smaller than an amount of video memory resources required by the higher-priority task, send a video memory resource release instruction to a first of the plurality of storage resource allocators; and send a video memory resource allocation instruction to a second of the plurality of storage resource allocators. The first of the plurality of storage resource allocators is configured to release at least a part of video memory resources occupied by a lower-priority task according to the video memory release instruction; and the second of the plurality of storage resource allocators is configured to allocate the video memory resources to a higher-priority task according to the video memory allocation instruction, wherein the higher-priority task is executed at least according to tensor data in a video memory space.

DETAILED DESCRIPTION

Many specific details are set forth in the description below to provide a thorough understanding of the present application. However, the present application can be implemented in many other ways that are different from those described here, and those skilled in the art may make similar promotions without violating the meaning of the present application. Therefore, the present application is not limited by the specific implementation disclosed below.

The present disclosure provides a video memory management method, apparatus and system, a machine learning system, and an electronic device. Various solutions will be described in detail in combination with specific embodiments below.

Figure 1:
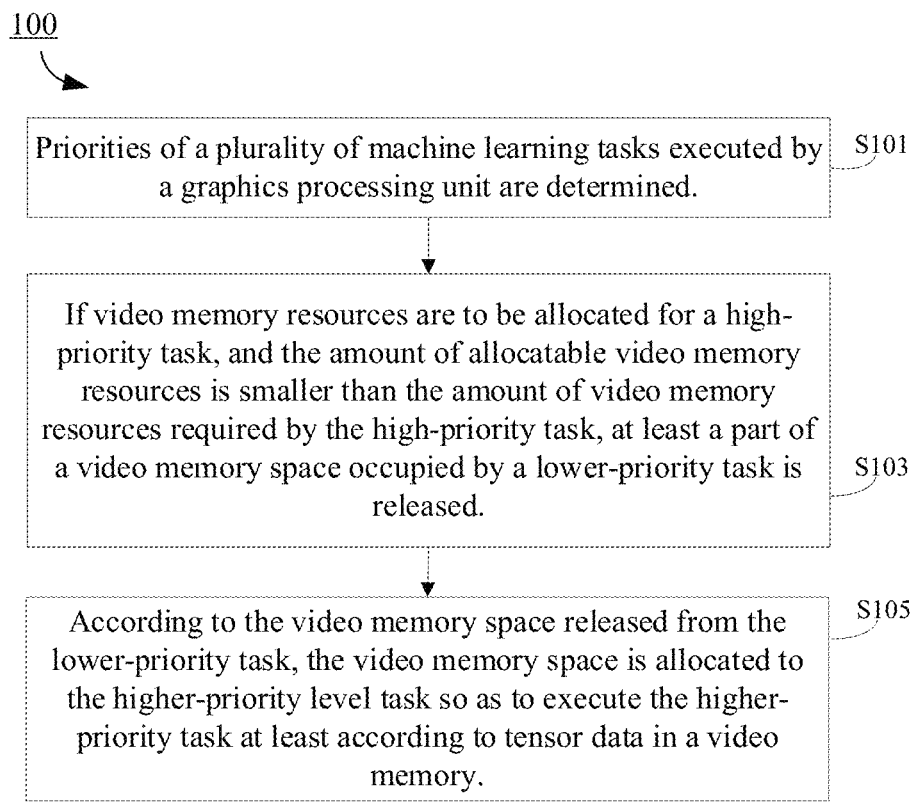
FIG. 1 is a schematic flowchart of a video memory management method, according to some embodiments of the present disclosure.

Please refer to FIG. 1 which is a schematic flowchart of an example of a video memory management method, according to some embodiments of the present disclosure. Video memory management method 100 provided by this example may include the following steps S101 to S105.

In step S101, priorities of a plurality of machine learning tasks executed by a graphics processing unit are determined.

The video memory management method provided by the present disclosure can be applied in a machine learning system, and is used for allocating and using GPU video memory resources when the plurality of machine learning tasks share the GPU video memory resources. The machine learning system may be a deep learning system constructed based on a deep learning computing framework, such as TensorFlow, PyTorch and other deep learning computing frameworks. The machine learning task, also called a machine learning model training task, may learn a machine learning model from training data. The model may be a model based on a deep neural network, and correspondingly, the machine learning task is a deep learning task. For example, the model is a named entity recognition model, a speech recognition model, a product recommendation model, or the like learned from the training data. The model may also be a machine learning model based on a non-neural network such as a decision tree.

Figure 2:
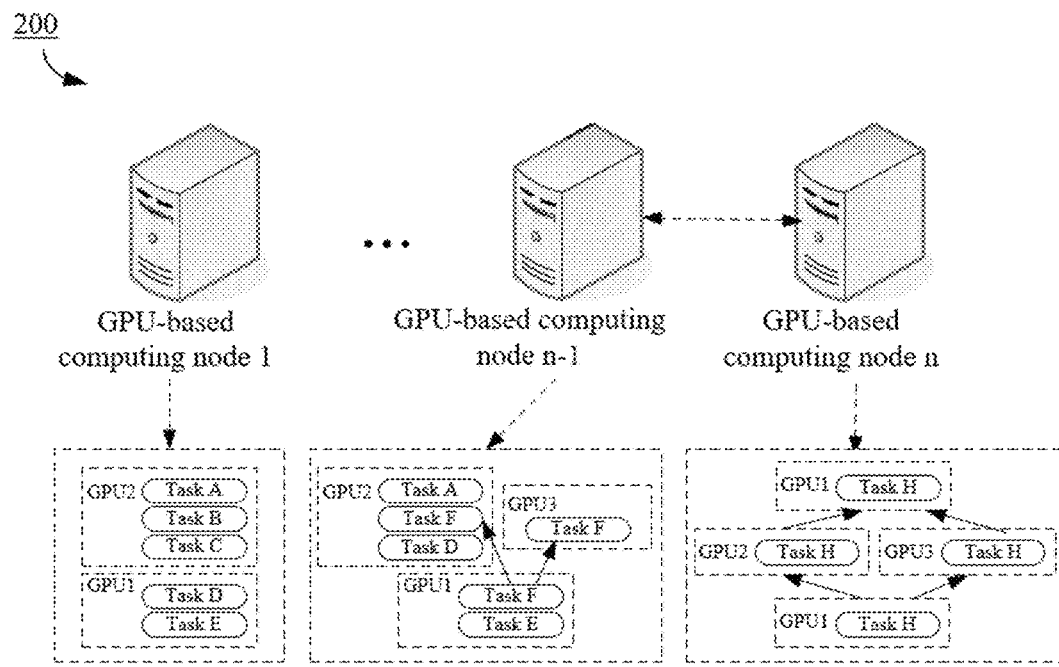
FIG. 2 is a schematic diagram showing an application scenario of a video memory management method, according to some embodiments of the present disclosure.

To illustrate the video memory management methods provided by the present disclosure more intuitively, an application scenario of the method is described below. As shown in FIG. 2, the machine learning system may be a distributed machine learning system 200, including one or more GPU-based computing nodes (e.g., GPU-based computing nodes 1 to n), also called GPU devices. Each GPU device may include one or more GPUs. A plurality of machine learning tasks may be executed in parallel on one GPU, and these machine learning tasks share video memory resources of the GPU. In addition, the GPU device further includes a central processing unit (CPU) and an internal memory, wherein the CPU may also be called a host machine of the GPU. In FIG. 2, GPU-based computing node 1 includes a GPU1 and a GPU2, wherein a task D and a task E are simultaneously executed on the GPU1, and a task A, a task B and a task C are simultaneously executed on the GPU2.

According to the video memory management method provided by the present disclosure, the video memory resources occupied by each task can be dynamically adjusted according to the performance guarantee priorities (referred to as priorities) of the plurality of tasks executed in parallel on the GPU. The higher the priority of the task, the more the performance of the task must be guaranteed. The priorities of the tasks may be determined according to application requirements, for example, only two priorities are set: a high priority and a low priority. For example, if a learning task A of the named entity recognition model is a "performance guarantee task" with a service level guarantee, and a learning task B of the speech recognition model is a "speculative execution task" without a service level guarantee, then the task A may be set with the high priority, and the task B may be set with the low priority.

During specific implementation, a plurality of priorities may also be set. Table 1 shows priority setting information of machine learning tasks in an example.

TABLE 1

Machine Learning Task Table

| Task ID | Task priority |
| --- | --- |
| Task A (Named Entity Recognition Model) | First level (highest priority) |
| Task B (Speech Recognition Model) | Second level (second highest priority) |
| Task C (product recommendation model) | Second level (second highest priority) |
| Task D (Language Model) | Third Level (lowest priority) |
| ... | |

It can be seen from Table 1 that three task priorities are set in this example, wherein the first level is the highest priority, the second level is the second highest priority, and the third level is the lowest priority. In this case, if there is a first-level task in parallel tasks, the performance of the first-level task must be guaranteed first. If the parallel tasks do not include a first-level task, the performance of a second-level task must be guaranteed.

In step S103, if video memory resources are to be allocated for a higher-priority task, and the amount of allocatable video memory resources is smaller than the amount of video memory resources required by the higher-priority task, at least a part of a video memory space occupied by a lower-priority task is released.

In the video memory management method provided by the present disclosure, when allocating the video memory resources to the higher-priority task, if the amount of the allocatable video memory resources on the GPU is smaller than the amount of the video memory resources required by the higher-priority task, a part or all of a video memory space occupied by the lower-priority task should be released, and the released video memory space is allocated to the higher-priority task, so as to store tensor data of the higher-priority task in a video memory as much as possible, and thus the executing performance of the higher-priority task can be guaranteed.

The amount of the required video memory resources may be the amount of video memory resources to be increased for a deep learning task being executed, or may be the amount of video memory resources initially required by a deep learning task to be executed. The amount of the required video memory resources may be determined by the deep learning task. Since a method for determining the amount of the required video memory resources is well-known according to prior art, it is not repeated here.

In this example, if a certain deep learning task in the machine learning task table (e.g., Table 1) of one GPU is to be executed, the video memory resources required by the task is determined first. After determining the video memory resources required by the task, if the amount of the allocatable video memory resources of the GPU is smaller than the amount of the video memory resource required by the task, the priority of the task and the priorities of other tasks that are executed on the GPU should be determined. If the priority of the task to be executed is higher than the priorities of the other tasks being executed, the video memory resources occupied by the lower-priority task should be releases to guarantee the performance of the higher-priority task.

In some embodiments, the amount of the video memory resources that should be released may be determined according to the amount of the video memory resources required by the task to be executed. For example, if the higher-priority task needs 1G video memory resources, 1.2G video memory resources occupied by the lower-priority task may be released.

In some embodiments, the video memory resources occupied by one or the plurality of lower-priority tasks may be released. For example, if the higher-priority task needs 5G video memory resources, and the video memory resources that are released from the lower-priority task is insufficient, the video memory resources occupied by the plurality of lower-priority tasks may be released to release the video memory resources more than 5G.

In some embodiments, the method may further include the following steps: releasing idle video memory resources occupied by the plurality of machine learning tasks. Generally, most deep learning tasks cannot fully utilize all of the allocated GPU memory resources at all times, and usually have idle video memory resources. The idle video memory resources of the deep learning tasks may be caused by the following reasons:
1) Product-oriented deep learning training tasks usually include a lot of computing parts, some of which are not easy to parallelize, so it is difficult to completely occupy the GPU video memory resources, such as image sampling in image neural networks, feature extraction in advertisement models, data augmentation in computer vision, or the like.
2) The deep learning system deals with massive training data. With the increase of data, a lot of time will be spent in a network data synchronization stage of the model in super-large distributed training. As shown in FIG. 2, the task E is executed on the GPU-based computing node 1 and the GPU-based computing node n−1 at the same time. Correspondingly, the GPU video memory resources are also idle during the data synchronization stage.
3) Distributed deep learning training usually uses a synchronous stochastic gradient descent (SGD) method, which requires that the resources required by a training task need to be satisfied at the same time, and then the training task may start. Therefore, from the perspective of a cluster scheduler, when the resources are insufficient, the scheduler needs to reserve some available resources for the distributed tasks until all of the required resources are satisfied. Such reservation process also causes the GPU memory resources to be at an idle waiting state.
4) In practical applications, some tensor data are only used in a specific deep learning training stage, such as data processing, model evaluation, or the like. These tensor data will not be used after the stage and will be cleared from the video memory, thereby producing idle video memory resources.

However, in an existing deep learning framework, the idle video memory resources will not be released, but will be always reserved for the task. The whole video memory resources occupied by the task are not reduced, and a part of the video memory resources are idle video memory resources. During subsequent executing processes, the task may use these video memory resources (e.g., for storing other tensor data), or may not use these video memory resources, thereby results in a relatively low utilization rate of the GPU resources in many cases.

According to the method provided by these embodiments, based on the usage status of the video memory resources, the idle video memory resources that remains and are not used by the tasks are released, and thus can be timely allocated to other tasks, to optimize the processing of the plurality of tasks in a shared GPU resource scenario, and prevent the other tasks from queuing up. Therefore, a resource utilization rate of the GPU is improved, and then throughput of the shared GPU cluster can be improved.

In some embodiments, the releasing idle video memory resources occupied by the plurality of machine learning tasks may include the following sub-steps: 1) determining usage status information of video memory resources of the machine learning task; and 2) if the information satisfies a video memory resource release condition, releasing idle video memory resources. The usage status information includes an upper limit of the video memory resources actually used by the task. The release condition includes a duration during which the amount of video memory resources allocated to the task is larger than the upper limit reaches a duration threshold. For example, during the executing of the task, the upper limit value (peak value) of the video memory resources that are actually used is determined every 10 seconds. When the amount of the video memory resources occupied by the task is larger than the peak value that is actually needed for 30 consecutive seconds (after the usage status information has been determined three times), the idle video memory resources will be released.

In some embodiments, the releasing at least a part of a video memory space occupied by a lower-priority task may include the following sub-steps: if the amount of idle video memory resources of the lower-priority task is larger than or equal to the amount of required video memory resources, releasing the idle video memory resources occupied by the lower-priority task. In this case, both types of tasks (e.g., a lower-priority task and a higher-priority task) may be executed based on data stored in the video memory space, so that not only the executing performance of the higher-priority task can be guaranteed, but also the performance of the lower-priority task can be prevented from being affected.

In some embodiments, the releasing at least a part of a video memory space occupied by a lower-priority task may further include the following sub-steps: if the amount of idle video memory resources of the lower-priority task is smaller than the amount of required video memory resources, allocating internal memory resources to the lower-priority task, and releasing at least a part of video memory resources used by the lower-priority task, so as to continue to execute the lower-priority task at least according to tensor data in an internal memory space.

The video memory resources used by the lower-priority task are not idle video memory resources, and the tensor data of the lower-priority tasks is still stored in these video memory resources which are needed by the lower-priority task needs to guarantee the executing performance. However, a part or all of the video memory resources used by the lower-priority task are released, and a part or all of the tensor data of the lower-priority task is temporarily transferred from the video memory space to the internal memory space for storage, so that the lower-priority task can be executed continuously at least according to the tensor data in the internal memory space. If only a part of the video memory resources used by the lower-priority task are released, the lower-priority task can be executed continuously based on one part of the tensor data in the internal memory space and another part of the tensor data in the video memory space. If all of the video memory resources used by the lower-priority task are released, the lower-priority task can be executed continuously based on all of the tensor data in the internal memory space. Hence, no matter what the situation is, the task will not fail.

By using such processing method, if video memory resource requirements of the higher-priority task still cannot be met after the idle video memory resources of the lower-priority task are released, the video memory resources occupied by the tensor data of the lower-priority task need to be further released. All or part of tensor data of the lower-priority task are transferred to the internal memory space of the host machine of the GPU for storage, to execute the lower-priority task at least based on the tensor data in the internal memory space. Therefore, the lower-priority task and the higher-priority task can be prevented from competing for the video memory resources, and the performance of the higher-priority task can be guaranteed, at the cost of sacrificing part of the performance of the lower-priority task.

Figure 3:
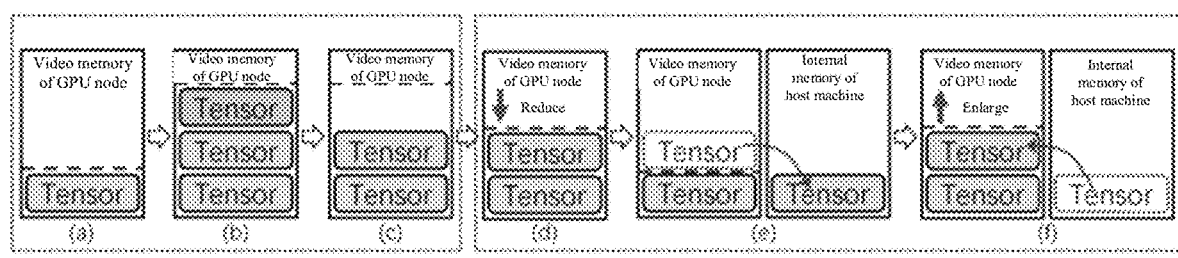
FIG. 3 is a schematic diagram showing dynamic scaling of video memory resources of a video memory management method, according to some embodiments of the present disclosure.

As shown in FIG. 3, a sub-figure (a) shows video memory resources occupied by a deep learning task in an initial stage in a video memory of GPU node. The video memory resources include a tensor of data, and the height of a dotted line indicates a level of the occupied video memory resources. A sub-figure (b) shows that an upper limit of video memory usage increases with a corresponding increase of tensor data required by the task. These tensor data may be cached in a pool of an internal memory allocator (e.g., a video memory resource allocator) of the task, that is, cached in a video memory space allocated to the task, so that next small-batch tensor data of the task can be reused. The enlarged video memory resource of the task may accommodate three tensors of data. With continuous executing of the task, some tensor data are only used in a specific deep learning training stage, and these tensor data will not be used after the stage and will be cleared from the video memory, thereby causing idle video memory resources. A sub-figure (c) shows that after one tensor of data is cleared, idle video memory resources are produced, while the level of the video memory resources does not change.

According to the method provided by the embodiments of the present disclosure, the upper limit of video memory usage is dynamically adjusted according to the video memory resources actually required by the task. In this example, the video memory resources currently in use are actively detected, and the idle video memory resources are released, thereby adjusting the upper limit of video memory usage to an appropriate value. A sub-figure (d) shows the level of the video memory resources after the available video memory (e.g., idle video memory resources) is recycled (or released), after the foregoing available video memory has not been used for a period of time.

In this example, a deep learning system open an interface to the outside, which allows the upper limit of GPU video memory usage for the task to be raised or reduced when the task is executed, and even reduced to a value lower than an actual requirement of the task. A sub-picture (e) may show a situation that when there is a higher-priority task and the allocatable video memory is insufficient, a tensor of data of a lower-priority task is transferred to an internal memory space of a host machine, so that the released video memory resources can be allocated to the higher-priority task, to guarantee the performance of the higher-priority task. By using such processing method, even if the video memory resources are insufficient, the lower-priority task can still be executed continuously without failing.

In some embodiments, the method may further include the following steps: if the amount of the allocatable video memory resources increases to the amount of the video memory resources required by the lower-priority task, allocating the video memory resources to the lower-priority task, so as to continue to execute the lower-priority task according to the tensor data in the video memory space. By using such processing method, when the GPU video memory resources are no longer in shortage, the upper limit of the video memory for the lower-priority task may be raised, and the tensor of the lower-priority task may also be reallocated on the GPU. A sub-figure (f) shows a situation that when the GPU video memory resources are no longer in shortage, the tensor data of the lower-priority task is transferred from the internal memory space to the video memory space again, so as to improve the performance of the lower-priority task as much as possible.

In some embodiments, the lower-priority tasks include iterative learning tasks. The releasing the video memory resources used by the lower-priority task may be implemented in the following manner: after the lower-priority task completes current iterative learning, releasing the used video memory resources.

In a deep learning scenario, to perform a gradient descent algorithm on the training set, an entire data set is usually divided into several small training sets, and one small subset is trained each time. In this way, on the one hand, the problem of a huge amount of calculation caused by all of the data sets participating in training at one time can be avoided. On the other hand, there is no big difference between a gradient direction of the subset and a gradient of the whole data set, which can guarantee the correctness of training. Such training method is also called a small batch training method. Such learning task is called the iterative learning task. Every time a small-batch training is performed, various data involved in the training must be stored in a storage space, and a container for storing the data is called a tensor (Tensor). The tensor is a data unit for storing data in a deep learning framework. As a data container, the tensor may store data during training, and a task may include a plurality of tensors in one training. Tensor data may be an arbitrary quantity of multi-dimensional arrays composed of a set of original values, including training data for one small-batch training, model parameters generated during training, and data of various intermediate nodes in a network, or the like.

In some embodiments, by transferring the tensor data between the video memory and the internal memory, the utilization rate of the GPU video memory resources is improved under the premise of guaranteeing the executing performance of the higher-priority task. By using the processing method of transferring the tensor data between the video memory and the internal memory, the internal memory resources can be used as the video memory resources when the video memory resources are insufficient, but this usually causes huge data copy overheads.

By studying the unique characteristics of the deep learning tasks, that is, the characteristics of the foregoing iterative learning, it is found that in the deep learning tasks, training is performed in small batches, and the tensor data will be created and destroyed in small batches. The same tensor will be repeatedly created between small batches, so as to choose to dynamically adjust the upper limit of video memory usage for the task on the boundary of the small batches. At this time, the tensor data has been released, so that data copy explicitly performed between the video memory and the internal memory can be avoided, thereby avoiding huge copy overheads.

In some embodiments, before the releasing the video memory resources used by the lower-priority task, the method may further include the following step: allocating a part of internal memory resources and a part of video memory resources to the higher-priority task, so as to execute the higher-priority task according to the tensor data in the internal memory space and the tensor data in the video memory space.

In some embodiments, after allocating video memory resources to the higher-priority task, the method may further include the following step: releasing the internal memory resources of the higher-priority task, so that the higher-priority task can be executed completely based on the tensor data in the video memory space.

Figure 4A:
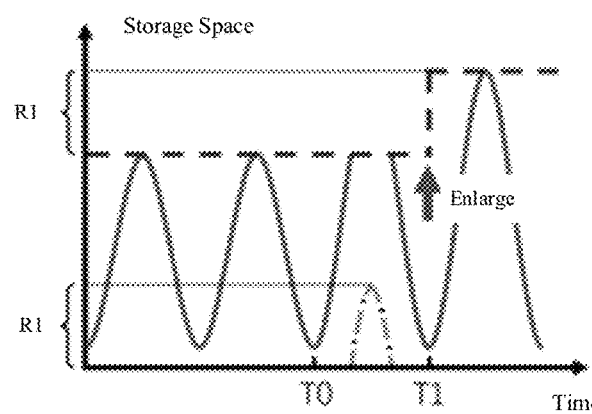
FIGS. 4A and 4B are schematic diagrams showing a change in video memory resources of a video memory management method, according to some embodiments of the present disclosure.
Figure 4B:
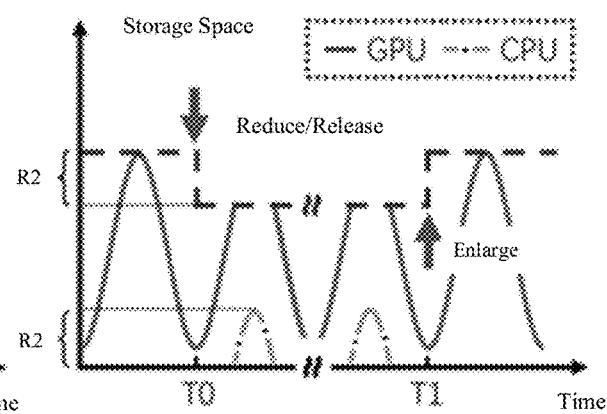

FIGS. 4A and 4B are schematic diagrams showing a change in video memory resources of a video memory management method, according to some embodiments of the present disclosure. As shown in FIG. 4A, video memory resources required by a higher-priority task suddenly increase at time T0, the required video memory resources are denoted as R1. At this time, allocatable video memory resources are insufficient, so that R1 is first occupied in an internal memory space, and the higher-priority task is executed temporarily based on the tensor data in an internal memory. At time T1, after a small-batch training of a lower-priority task is completed, tensor data of the lower-priority task is transferred to the internal memory, and video memory resources R1 released from the lower-priority task are allocated to the higher-priority task, and meanwhile internal memory resources R1 occupied by the higher-priority task are released, so that the video memory resources of the higher-priority task are increased by R1, and the higher-priority task is continuously executed on the video memory. By using such processing method, the performance of the higher-priority task is only reduced in an extremely short period of time, and cannot be failed. Meanwhile, huge copy overheads may be avoided.

As shown in FIG. 4B, during the time period from T0 to T1, video memory resources R2 used by a lower-priority task is released, and R2 is occupied in an internal memory space. The lower-priority task is executed based on tensor data in an internal memory space, and thus part of the operating performance is lost. Then, after video memory resources are released from other tasks, the video memory resources of the lower-priority task at time T1 are increased by R2, and the lower-priority task is continuously executed based on tensor data in a video memory space.

In some embodiments, not only a video memory space occupied by the lower-priority task can be released, but also an idle video memory space occupied by other higher-priority tasks can be released. By using such processing method, more video memory resources may be released, and the performance of the lower-priority task are effectively improved.

In some embodiments, the method may further include step S105. In step S105, according to the video memory space released from the lower-priority task, the video memory space is allocated to the higher-priority level task so as to execute the higher-priority task at least according to tensor data in a video memory.

It can be seen from the foregoing embodiments, according to the video memory management method provided by the embodiments of the present disclosure, the priorities of the plurality of machine learning tasks executed by the graphics processing unit are determined. If the video memory resources are to be allocated to the higher-priority task and the amount of the allocatable video memory resources is smaller than the amount of the video memory resources required by the higher-priority task, at least a part of the video memory resources occupied by the lower-priority task are released; and the video memory resources are allocated to the higher-priority task, so as to execute the higher-priority task at least according to the tensor data in the video memory space. Such processing mode allocates the video memory resources occupied by the lower-priority task to the higher-priority task when the allocatable video memory resources are insufficient, thereby realizing dynamic scaling optimization of the GPU video memory resources occupied by the plurality of machine learning tasks executed in parallel on the GPU, and in this way, the GPU video memory resources can be allocated to the other tasks under the premise of guaranteeing the performance of the higher-priority task. Therefore, a resource utilization rate of a whole cluster can be improved, and meanwhile the performance of the higher-priority task is guaranteed.

In the foregoing embodiments, a video memory management method is provided. Correspondingly, the present disclosure further provides a video memory management apparatus. The apparatus corresponds to the foregoing method embodiments. Since the apparatus embodiments are basically similar to the method embodiments, the apparatus embodiments are simply described, and for relevant parts, reference can be made to part of the description of the method embodiments. The apparatus embodiments described below are illustrative only.

Figure 5:
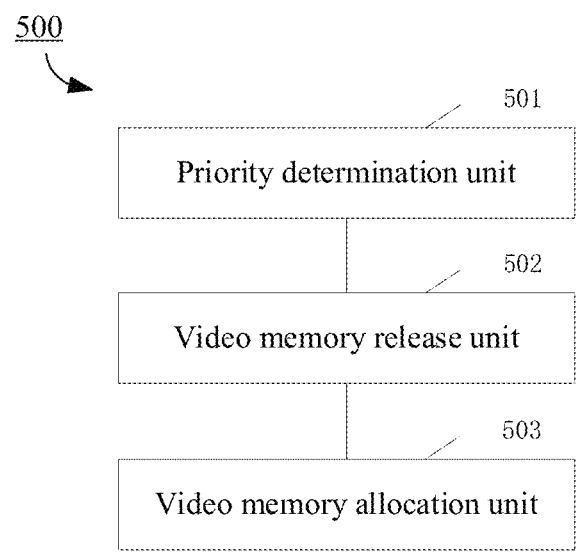
FIG. 5 is a schematic structural diagram of a video memory management apparatus, according to some embodiments of the present disclosure.

Please refer to FIG. 5 which is a schematic structural diagram of an example of a video memory management apparatus 500, according to some embodiments of the present disclosure. Video memory management apparatus 500 includes a priority determination unit 501, a video memory release unit 502, and a video memory allocation unit 503. Priority determination unit 501 includes circuitry configured to determine priorities of a plurality of machine learning tasks executed by a graphics processing unit. Video memory release unit 502 includes circuitry configured to release at least a part of video memory resources occupied by a lower-priority task if video memory resources are to be allocated for a higher-priority task, and the amount of allocatable video memory resources is smaller than the amount of video memory resource required by the higher-priority task. Video memory allocation unit 503 includes circuitry configured to allocate the video memory resources to the higher-priority task, so as to execute the higher-priority task at least according to tensor data in a video memory space.

In the foregoing embodiments, a video memory management method is provided, Correspondingly, the present disclosure further provides an electronic device. The device corresponds to the foregoing method embodiments. Since the device embodiment is basically similar to the method embodiments, the device embodiments are simply described, and for relevant parts, reference can be made to part of the description of the method embodiments. The device embodiment described below are illustrative only.

The electronic device provided by present disclosure includes a processor and a memory, wherein the memory is configured to store a program for implementing a video memory management method, and after being powered on and executing the program of the method by the processor, the device performs the following steps: determining priorities of a plurality of machine learning tasks executed by a graphics processing unit; if video memory resources are to be allocated for a higher-priority task, and an allocatable video memory space is smaller than a video memory space required by the higher-priority task, releasing at least a part of a video memory space of a lower-priority task; and allocating the video memory space to the higher-priority task according to the video memory space released from the lower-priority task, so as to execute the higher-priority task at least according to tensor data in a video memory.

Corresponding to the foregoing video memory management method 100, the present disclosure further provides a video memory management method. The parts in this example that are the same as those in video memory management method 100 will not be described again, please refer to the corresponding parts in the description of video memory management method 100.

In this example, the method may include Step 1 to Step 3.

In step 1, a machine learning task is executed by a graphics processing unit.

In step 2, the usage status information of video memory resources of the machine learning task is determined.

In step 3, if the information satisfies a video memory resource release condition, idle video memory resources occupied by the task are released, so as to allocate the idle video memory resources to other machine learning tasks that are executed in parallel by the graphics processing unit.

The machine learning tasks include, but are not limited to, deep learning tasks. The idle video memory resources may include at least one of the following resources: idle video memory resources generated by modules that cannot be processed in parallel in the deep learning task, and idle video memory resources generated when a plurality of resources required by the deep learning task are satisfied.

The machine learning task may be a distributed deep learning task. The idle video memory resources may be idle video memory resources generated when a plurality of image processing units corresponding to a distributed deep learning task synchronize data.

Specifically, the idle video memory resources of the deep learning task may be caused by the following reasons:

1) Idle video memory resources generated by the modules that cannot be processed in parallel in the deep learning task. Product-oriented deep learning training tasks usually include a lot of computing parts, some of which are not easy to parallelize, so it is difficult to completely occupy GPU memory resources, such as image sampling in image neural networks, feature extraction in advertisement models, data augmentation in computer vision, or the like.

2) Idle video memory resources generated when the plurality of image processing units corresponding to the distributed deep learning task synchronize data. The deep learning system deals with massive training data. With the increase of data, a lot of time will be spent in a network data synchronization stage of the model in super-large distributed training. As shown in FIG. 2, a task E is executed in a GPU-based computing node 1 and a GPU-based computing node n−1 at the same time. Correspondingly, GPU memory resources are also idle during the data synchronization period.

3) Idle video memory resources generated while waiting for the plurality of resources required by the deep learning task to be satisfied. Distributed deep learning training usually uses a synchronous stochastic gradient descent (SGD) method, which requires that the resources required by a training task need to be satisfied at the same time, and then the training task may start. Therefore, from the perspective of a cluster scheduler, when the resources are insufficient, the scheduler needs to reserve some available resources for the distributed tasks until all of the required resources are satisfied. Such reservation process also causes the GPU memory resources to be at an idle waiting state.

4) In practical applications, some tensor data are only used in a specific deep learning training stage, such as data processing, model evaluation, or the like, and these tensor data will not be used after the stage and will be cleared from the video memory, thereby producing idle video memory resources.

The usage status information includes, but is not limited to, an upper limit of the video memory resources actually used by the task. The release condition includes, but is not limited to, a duration during which the amount of video memory resources allocated to the task is larger than the upper limit reaches a duration threshold. The duration threshold may be determined according to application requirements, for example, set to 30 seconds.

For example, during the executing of the task, the upper limit value (peak value) of the video memory resources that are actually used is determined every 10 seconds. When the amount of the video memory resources occupied by the task is larger than the peak value that is actually needed for 30 consecutive seconds (after the usage status information being determined three times), the idle video memory resources will be released.

It can be seen from the foregoing embodiments, according to the video memory management methods provided by the embodiments of the present disclosure, the machine learning task is executed by the graphics processing unit; the usage status information of the video memory resources of the machine learning task is determined; if the information satisfies a video memory resources release condition, the idle video memory resources occupied by the task are released, so as to allocate the idle video memory resources to other machine learning tasks executed in parallel by the graphics processing unit. Due to such processing method, the idle video memory resources occupied by the task are released in time. Therefore, a resource utilization rate of a whole cluster can be effectively improved.

In the foregoing embodiments, a video memory management method is provided, Correspondingly, the present disclosure further provides a video memory management apparatus. The apparatus corresponds to the foregoing method embodiments. Since the apparatus embodiments are basically similar to the method embodiments, the apparatus embodiments are simply described, and for relevant parts, reference can be made to part of the description of the method embodiments. The apparatus embodiments described below are illustrative only.

In this example, the apparatus includes a task executing unit, an information determining unit, and a video memory release unit. The task executing unit includes circuitry configured to execute a machine learning task by a graphics processing unit. The information determining unit includes circuitry configured to determine the usage status information of video memory resources of the machine learning task. The video memory release unit includes circuitry configured to release idle video memory resources occupied by the task if the information satisfies a video memory resource release condition, so as to allocate the idle video memory resources to other machine learning tasks that are executed in parallel by the graphics processing unit.

In the foregoing embodiment, a video memory management method is provided, Correspondingly, the present disclosure further provides an electronic device. The device corresponds to the foregoing method embodiments. Since the device embodiments are basically similar to the method embodiments, the device embodiments are simply described, and for relevant parts, reference can be made to part of the description of the method embodiments. The device embodiments described below are illustrative only.

The electronic device provided by the present disclosure includes a processor and a memory, wherein the memory is configured to store a program for implementing a video memory management method, and after being powered on and executing the program of the method by the processor, the device performs the following steps: executing a machine learning task by a graphics processing unit; determining the usage status information of video memory resources of the machine learning task; if the information satisfies a video memory resource release condition, releasing idle video memory resources occupied by the task, so as to allocate the idle video memory resources to other machine learning tasks executed in parallel by the graphics processing unit.

Corresponding to the foregoing video memory management method 100, the present disclosure further provides a video memory management system. The parts in this example that are the same as those in video memory management method 100 will not be described again, please refer to the corresponding parts in the description of video memory management method 100.

Figure 6:
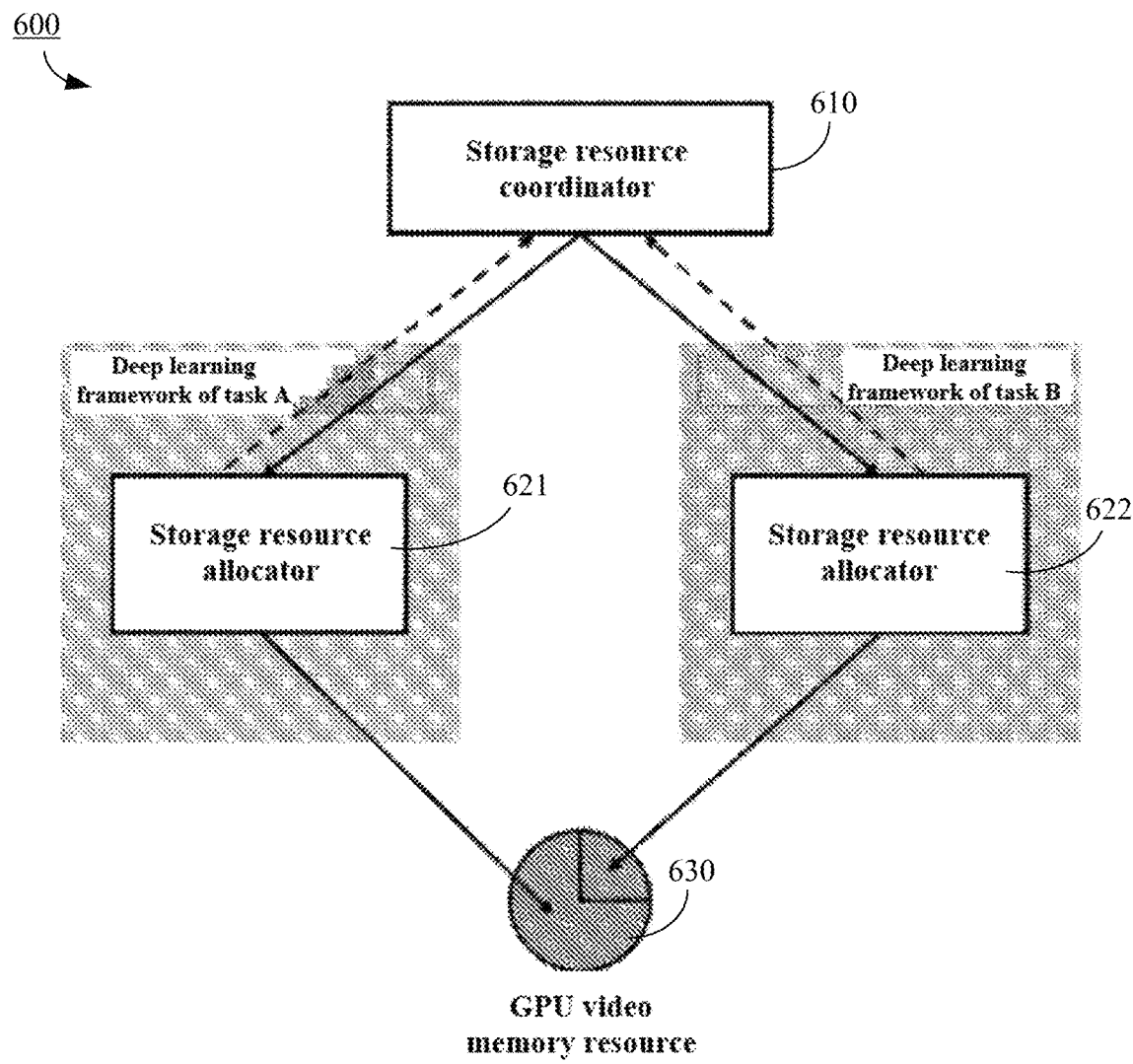
FIG. 6 is a schematic structural diagram of a video memory management system, according to some embodiments of the present disclosure.

Please refer to FIG. 6 which is a schematic structural diagram of an example of a video memory management apparatus according to some embodiments of the present disclosure. The video memory management system 600 provided by the present disclosure includes: a storage resource coordinator 610, a storage resource allocator (a first storage resource allocator 621) of lower-priority tasks (such as a task A), and a storage resource allocator (a second storage resource allocator 622) of lower-priority tasks (such as a task B).

The system provided by this example realizes adaptive dynamic scaling optimization of GPU video memory resources 630 for machine learning tasks through co-design of the storage resource coordinator and a machine learning computing framework. As shown in FIG. 6, the storage resource coordinator 610 supports adaptive GPU video memory resource adjustment, and can be deployed in a GPU computing node to schedule and manage memory resources of one or more GPUs in the node, to dynamically adjust the usage of the GPU video memory resources 630 for a plurality of tasks on one GPU. The machine learning computing framework corresponds to machine learning tasks, and each task is executed by the machine learning computing framework.

The machine learning computing framework may be an end-to-end machine learning platform, and various machine learning frameworks can have own ecosystems, which include various tools, libraries and other resources, and can help developers easily build and deploy applications supported by machine learning. In this example, the machine learning computing framework is a deep learning computing framework, including but not limited to TensorFlow, PyTorch, MXNet, Caffe, etc.

The storage resource coordinator 610 is configured to determine priorities of a plurality of machine learning tasks executed by a graphics processing unit. If video memory resources are to be allocated to a higher-priority task, and the amount of allocatable video memory resources is smaller than the amount of video memory resources required by the higher-priority task, a video memory resource release instruction is sent to the storage resource allocator of lower-priority tasks (a first storage resource allocator 621), and a video memory resource allocation instruction is sent to the storage resource allocator of lower-priority tasks (a second storage resource allocator 622). The storage resource allocator 621 of lower-priority tasks (e.g., task A) is configured to release at least a part of video memory resources occupied by a lower-priority task according to the release instruction. The storage resource allocator 622 of higher-priority tasks (e.g., task B) is configured to allocate the video memory resources to the higher-priority task according to the allocation instruction, so as to execute the higher-priority task at least according to tensor data of a video memory space.

In some embodiments, the storage resource allocators (e.g., 621 and 622) are further configured to send the usage status information of the video memory resources of the machine learning tasks. In some embodiments, the storage resource allocators can send the information to the coordinator according to a preset period. Correspondingly, the storage resource coordinator 610 is further configured to send a video memory resource release instruction to the allocator if the information satisfies a video memory resource release condition.

It can be seen from the foregoing embodiments, according to the video memory management system provided by the embodiments of the present disclosure, the priorities of the plurality of machine learning tasks executed by the graphics processing unit are determined by the storage resource coordinator. If video memory resources are to be allocated for the higher-priority task and the amount of the allocatable video memory resources is smaller than the amount of the video memory resources required by the higher-priority task, the video memory resource release instruction is sent to the first storage resource allocator of lower-priority tasks, and the video memory resource allocation instruction is sent to the second storage resource allocator of lower-priority tasks; the first storage resource allocator releases at least a part of the video memory resources occupied by the lower-priority task according to the release instruction; the second storage resource allocator allocates the video memory resources to the higher-priority task according to the allocation instruction, so as to execute the higher-priority task at least according to the tensor data in the video memory space.

Such processing mode allocates the video memory resources occupied by the lower-priority task to the higher-priority task by the local storage resource coordinator of the GPU device when the allocatable video memory resources are insufficient, thereby realizing dynamic scaling optimization of the GPU video memory resources occupied by the plurality of machine learning tasks executed in parallel on the GPU, and in this way, the GPU video memory resources can be allocated to the other tasks under the premise of guaranteeing the performance of the higher-priority task. Therefore, a resource utilization rate of a whole cluster can be improved, and meanwhile the performance of the higher-priority task is guaranteed.

Corresponding to the foregoing video memory management methods, the present disclosure further provides a machine learning system. The parts in this example that are the same as those in video memory management method 100 will not be described again, please refer to the corresponding parts in the description of video memory management method 100. The machine learning system provided by the present disclosure includes a client and a server.

The client is configured to send the priority information of machine learning tasks to the server. The server is configured to determine the priorities of the plurality of machine learning tasks executed by a graphics processing unit; if video memory resources are to be allocated for a higher-priority task and the amount of allocatable video memory resources is smaller than the amount of video memory resources required by the higher-priority task, release at least a part of the video memory resources occupied by a lower-priority task; and allocate the video memory resources to the higher-priority task, so as to execute the higher-priority task at least according to tensor data in a video memory space.

The client includes, but is not limited to, mobile communication devices, that is, mobile phones or smart phones, as well as personal computers, personal digital assistants (PADs), iPads and other terminal device. The server may execute the machine learning tasks on a GPU cluster.

In this example, a task service apparatus may be provided for a user via the client, and the user may determine a machine learning task to be executed by the task service apparatus of the client, and set the priority of the task, for example, selecting "second level" priority, and different service charges may need to be paid for different priorities. After determining the machine learning task to be executed and setting the priority of the task, the client may submit a task executing request to the server. In response to the request, the server may store the priority information of the task and store the task in a task table.

In this example, the server may include one or more GPU computing nodes, each node may execute the machine learning task in a machine learning framework, and a storage resource coordinator deployed in the GPU computing node may obtain the priority information of the plurality of tasks that are to be executed by the computing node. Table 2 shows machine learning task information in this embodiment.

TABLE 2

Machine Learning Task Table

| Task ID | User ID | Task priority |
|---|---|---|
| Task A (Named Entity Recognition Model) | User A | First level (Performance Guarantee Tasks) |
| Task B (Named Entity Recognition Model) | User B | Second level (speculative execution tasks) |
| Task C (product recommendation model) | User C | Second level (speculative execution tasks) |
| Task D (Language Model) | User C | First level (Performance Guarantee Tasks) |
| ... | | |

It can be seen from Table 2 that the learning task A of the named entity recognition model of the user A is a "performance guarantee task", the learning task B of the named entity recognition model of the user B is a "speculative execution task", and the priority of the "performance guarantee task" is higher than the priority of the "speculative execution task".

After the priorities of the plurality of machine learning tasks executed by the graphics processing unit are determined, the following operations can be performed: if video memory resources are to be allocated to the higher-priority task, and the amount of the allocatable video memory resources is smaller than the amount of the video memory resources required by the higher-priority task, releasing at least a part of the video memory resources occupied by the lower-priority task; and allocating the video memory resources to the higher-priority task, so as to execute the higher-priority task at least according to the tensor data in the video memory space.

In some embodiments, the server is further configured to determine the performance information of the machine learning tasks; and adjust the priorities of the tasks according to the performance information.

For example, the priority of the task A is originally the second level, but the performance of the task does not meet service level requirements of the "second level" required by the user by the system, so that the priority of the task may be adjusted to the first level, and thus the actual performance of the task can meet the service level requirements of the "second level" required by the user.

In some embodiments, the server can record the change information of the video memory resources during the executing of the machine learning task, and adjust the priority information of the task according to the change information. For example, if a higher-priority task is executed 30% of the time based on tensor data in an internal memory space, the performance information of the task does not meet the service level requirements, and therefore, the priority of the task can be increased.

In some embodiments, the server is further configured to determine the performance information of the machine learning tasks; and determine the priorities of the machine learning tasks that can be served.

For example, if the service level requirements of the task A and the task B can be met by the system, but the service level requirement of the task C cannot be met, a video memory resource management service can be provided for the task A and the task B.

It can be seen from the foregoing embodiments, according to the machine learning system provided by the embodiments of the present disclosure, the client sends the priority information of the machine learning tasks to the server; the server determines the priorities of the plurality of machine learning tasks executed by the graphics processing unit; if video memory resources are to be allocated for the higher-priority task and the amount of the allocatable video memory resources is smaller than the amount of the video memory resources required by the higher-priority task, at least a part of the video memory resources occupied by the lower-priority task are released; and the video memory resources are allocated to the higher-priority task, so as to execute the higher-priority task at least according to the tensor data in the video memory space. Such processing mode allocates the video memory resources occupied by the lower-priority task to the higher-priority task when the allocatable video memory resources are insufficient, thereby realizing dynamic scaling optimization of the GPU video memory resources occupied by the plurality of machine learning tasks executed in parallel on the GPU, and in this way, the GPU video memory resources are allocated to the other tasks under the premise of guaranteeing the performance of the higher-priority task. Therefore, a resource utilization rate of a whole cluster can be improved, and meanwhile the performance of the higher-priority task is guaranteed.

The embodiments may further be described using the following clauses:

1. A video memory management method, comprising:
   determining priorities of a plurality of machine learning tasks executed by a graphics processing unit;
   if video memory resources are to be allocated for a higher-priority task, and an amount of allocatable video memory resources is smaller than an amount of video memory resources required by the higher-priority task, releasing at least a part of video memory resources occupied by a lower-priority task; and
   allocating video memory resources to the higher-priority task, so as to execute the higher-priority task at least according to tensor data in a video memory space.

2. The method according to clause 1, further comprising:
   releasing idle video memory resources occupied by the plurality of machine learning tasks.

3. The method according to clause 2, wherein the releasing idle video memory resources occupied by the plurality of machine learning tasks comprises:
   determining usage status information of video memory resources of the plurality of machine learning tasks; and
   if the information satisfies a video memory resource release condition, releasing the idle video memory resources.

4. The method according to clause 3, wherein
   the usage status information comprises: an upper limit of video memory resources actually used by the task; and
   the release condition comprises: a duration during which an amount of video memory resource allocated to the task is larger than the upper limit reaches a duration threshold.

5. The method according to clause 1, further comprising:
   releasing idle video memory resources of other higher-priority tasks.

6. The method according to clause 1, wherein releasing at least a part of the video memory resources occupied by the lower-priority task comprises:
   if an amount of idle video memory resources of the lower-priority task is larger than or equal to an amount of the required video memory resources, releasing the idle video memory resources occupied by the lower-priority task.

7. The method according to clause 1 or 6, wherein releasing at least a part of the video memory resources occupied by the lower-priority task comprises:
   if an amount of the idle video memory resources of the lower-priority task is smaller than an amount of the required video memory resources,
   allocating internal memory resources to the lower-priority task; and
   releasing at least a part of the video memory resources used by the lower-priority task, so as to continue to execute the lower-priority task at least according to tensor data in an internal memory space.

8. The method according to clause 7, further comprising:
   if the amount of the allocatable video memory resources increases to the amount of the video memory resources required by the lower-priority task, allocating the video memory resources to the lower-priority task, so as to continue to execute the lower-priority task according to the tensor data in the video memory space.

9. The method according to clause 7, wherein the lower-priority task comprises an iterative learning task; and
   releasing the video memory resources used by the lower-priority task comprises:
   after the lower-priority task completes current iterative learning, releasing at least a part of the video memory resources used by the lower-priority task.

10. The method according to clause 9, wherein before the releasing at least a part of the video memory resources used by the lower-priority task, the method further comprises:
    allocating internal memory resources to the higher-priority task, so as to execute the higher-priority task according to the tensor data in the internal memory space and the tensor data in the video memory space.

11. The method according to clause 10, wherein after allocating memory resources to the higher-priority task, the method further comprises:
    releasing the internal memory resources of the higher-priority task.

12. The method according to clause 1, wherein the machine learning tasks comprise distributed deep learning tasks.

13. A video memory management method, comprising:
    executing a machine learning task by a graphics processing unit;
    determining usage status information of video memory resources of the machine learning task; and
    if the information satisfies a video memory resource release condition, releasing idle video memory resources occupied by the task, so as to allocate the idle video memory resources to other machine learning tasks that are executed in parallel by the graphics processing unit.

14. A video memory management apparatus, comprising:
    a priority determination unit comprising circuitry configured to determine priorities of a plurality of machine learning tasks executed by a graphics processing unit;
    a video memory release unit comprising circuitry configured to release at least a part of video memory resources occupied by a lower-priority task if a higher-priority task is required to allocate video memory resources, and an amount of allocatable video memory resources is smaller than an amount of video memory resource required by the higher-priority task; and
    a video memory allocation unit comprising circuitry configured to allocate the video memory resources to the higher-priority task, so as to execute the higher-priority task at least according to tensor data in a video memory space.

15. An electronic device, comprising a processor and a memory, wherein the memory is configured to store a program for implementing the video memory management method according to any one of clauses 1 to 12, and the device is powered on and executes the program of the method by the processor.

16. A video memory management apparatus, comprising:
a task executing unit comprising circuitry configured to execute a machine learning task by a graphics processing unit;
an information determining unit comprising circuitry configured to determine usage status information of video memory resources of the machine learning task; and
a video memory release unit comprising circuitry configured to release idle video memory resources occupied by the task if the information satisfies a video memory resource release condition, so as to allocate the idle video memory resources to other machine learning tasks that are executed in parallel by the graphics processing unit.

17. An electronic device, comprising:
a processor and a memory, wherein
the memory is configured to store a program for implementing the video memory management method according to clause 13, and the device is powered on and executes the program of the method by the processor.

18. A video memory management system, comprising:
a storage resource coordinator configured to:
  determine priorities of a plurality of machine learning tasks that are executed by a graphics processing unit; and
  if video memory resources are to be allocated for a higher-priority task, and an amount of allocatable video memory resources is smaller than an amount of video memory resources of the higher-priority task,
    send a video memory resource release instruction to a first storage resource allocator of lower-priority tasks; and
    send a video memory resource allocation instruction to a second storage resource allocator of higher-priority tasks;
a first storage resource allocator configured to release at least a part of video memory resources occupied by the lower-priority task according to the release instruction; and
a second storage resource allocator configured to allocate the video memory resources to the higher-priority task according to the allocation instruction, so as to execute the higher-priority task at least according to tensor data in a video memory space.

19. The system according to clause 18, wherein the allocator is further configured to send usage status information of the video memory resources of the tasks; and
the coordinator is further configured to send the video memory resource release instruction to the allocator if the information satisfies a video memory resource release condition.

20. The system according to clause 19, wherein the allocator is further configured to send the information to the coordinator according to a preset period.

21. A machine learning system, comprising:
a client configured to send priority information of machine learning tasks to a server; and
a server configured to determine priorities of the plurality of machine learning tasks executed by a graphics processing unit; if video memory resources are to be allocated to a higher-priority task, and an amount of allocatable video memory resources is smaller than an amount of video memory resources required by the higher-priority task, release at least a part of video memory resources occupied by a lower-priority task; and allocate the video memory resources to the higher-priority task, so as to execute the higher-priority task at least according to tensor data in a video memory space.

In some embodiments, a computing device includes one or more processors (CPUs), an input/output interface, a network interface, and a memory.

The memory may include a volatile memory, a random access memory (RAM), and/or a non-volatile memory in computer-readable media, e.g., a read-only memory (ROM) or a flash RAM. The memory is an example of the computer-readable medium.

Those skilled in the art should understand that the embodiments of the present disclosure can be provided as a method, a system, or a computer program product. Therefore, the present disclosure may be in the form of a pure hardware embodiment, a pure software embodiment, or an embodiment combining software and hardware. Moreover, the present disclosure can be in the form of a computer program product implemented on one or more computer-usable storage media (including, but not limited to, a magnetic disk memory, a CD-ROM, an optical memory, and the like) including computer-usable program code.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video memory management method, comprising:
   determining priorities of a plurality of machine learning tasks executed by a graphics processing unit;
   if video memory resources are to be allocated for a higher-priority task, and an amount of allocatable video memory resources is smaller than an amount of video memory resources required by the higher-priority task, releasing at least a part of video memory resources occupied by a lower-priority task; and
   allocating video memory resources to the higher-priority task, wherein the higher-priority task is executed at least according to tensor data in a video memory space;
   wherein the lower-priority task comprises an iterative learning task and releasing at least a part of the video memory resources occupied by the lower-priority task comprises:
   if an amount of idle video memory resources of the lower-priority task is smaller than the amount of video memory resources required by the higher-priority task, allocating internal memory resources to the lower-priority task for the at least a part of tensor data;
   after the lower-priority task completes current iterative learning, releasing at least a part of the video memory resources occupied by the lower-priority task, wherein the at least a part of tensor data is transferred to an internal memory space and the lower-priority task is executed at least according to the tensor data in the internal memory space.

2. The method according to claim 1, further comprising:
   releasing idle video memory resources occupied by the plurality of machine learning tasks.

3. The method according to claim 2, wherein releasing the idle video memory resources occupied by the plurality of machine learning tasks comprises:
   determining usage status information of video memory resources of the plurality of machine learning tasks; and
   if the usage status information satisfies a video memory resource release condition, releasing the idle video memory resources.

4. The method according to claim 3, wherein the usage status information comprises an upper limit of video memory resources used by one of the plurality of machine learning tasks; and the video memory resource release condition comprises a duration during which an amount of video memory resource allocated to the one of the plurality of machine learning tasks is larger than the upper limit reaches a duration threshold.

5. The method according to claim 1, further comprising:
   releasing idle video memory resources of other higher-priority tasks.

6. The method according to claim 1, wherein releasing at least a part of the video memory resources occupied by the lower-priority task comprises:
   if an amount of idle video memory resources of the lower-priority task is larger than or equal to the amount of video memory resources required by the higher-priority task, releasing the idle video memory resources occupied by the lower-priority task.

7. The method according to claim 1, wherein the machine learning tasks comprise distributed deep learning tasks.

8. The method according to claim 1, further comprising:
   if the amount of the allocatable video memory resources increases to an amount of the video memory resources required by the lower-priority task, allocating video memory resources to the lower-priority task, wherein the lower-priority task is executed according to tensor data in the video memory space.

9. The method according to claim 1, wherein before releasing at least a part of the video memory resources occupied by the lower-priority task, the method further comprises:
   allocating internal memory resources to the higher-priority task, wherein the higher-priority task is executed according to tensor data in the internal memory space and the tensor data in the video memory space.

10. The method according to claim 9, wherein after allocating memory resources to the higher-priority task, the method further comprises:
    releasing the internal memory resources of the higher-priority task.

11. An electronic device for performing a video memory management method, the electronic device comprises:
    a memory configured to store instructions; and
    one or more processors configured to execute the instructions to cause the electronic device to perform:
    determining priorities of a plurality of machine learning tasks executed by a graphics processing unit;
    if video memory resources are to be allocated for a higher-priority task, and an amount of allocatable video memory resources is smaller than an amount of video memory resources required by the higher-priority task, releasing at least a part of video memory resources occupied by a lower-priority task; and
    allocating video memory resources to the higher-priority task, wherein the higher-priority task is executed at least according to tensor data in a video memory space; wherein the lower-priority task comprises an iterative learning task and releasing at least a part of the video memory resources occupied by the lower-priority task comprises:
if an amount of idle video memory resources of the lower-priority task is smaller than the amount of video memory resources required by the higher-priority task, allocating internal memory resources to the lower-priority task for the at least a part of tensor data;
after the lower-priority task completes current iterative learning, releasing at least a part of the video memory resources occupied by the lower-priority task, wherein the at least a part of tensor data is transferred to an internal memory space and the lower-priority task is executed at least according to the tensor data in the internal memory space.

12. The electronic device according to claim 11, wherein the one or more processors are further configured to execute the instructions to cause the electronic device to perform:
releasing idle video memory resources occupied by the plurality of machine learning tasks.

13. The electronic device according to claim 11, wherein the one or more processors are further configured to execute the instructions to cause the electronic device to perform:
releasing idle video memory resources of other higher-priority tasks.

14. The electronic device according to claim 11, wherein in releasing at least a part of the video memory resources occupied by the lower-priority task, the one or more processors are further configured to execute the instructions to cause the electronic device to perform:
if an amount of idle video memory resources of the lower-priority task is larger than or equal to the amount of video memory resources required by the higher-priority task, releasing the idle video memory resources occupied by the lower-priority task.

15. A video memory management system, comprising a storage resource coordinator and a plurality of storage resource allocators, wherein
the storage resource coordinator is configured to:
determine priorities of a plurality of machine learning tasks that are executed by a graphics processing unit; and
if video memory resources are to be allocated for a higher-priority task, and an amount of allocatable video memory resources is smaller than an amount of video memory resources required by the higher-priority task,
send a video memory resource release instruction to a first of the plurality of storage resource allocators; and
send a video memory resource allocation instruction to a second of the plurality of storage resource allocators;
the first of the plurality of storage resource allocators is configured to release at least a part of video memory resources occupied by a lower-priority task according to the video memory release instruction; and
the second of the plurality of storage resource allocators is configured to allocate the video memory resources to a higher-priority task according to the video memory allocation instruction, wherein the higher-priority task is executed at least according to tensor data in a video memory space; wherein the lower-priority task comprises an iterative learning task and the storage resource coordinator is further configured to:
if an amount of idle video memory resources of the lower-priority task is smaller than the amount of video memory resources required by the higher-priority task,
send the video memory resource allocation instruction to the second of the plurality of storage resource allocators; and
send the video memory resource release instruction to the first of the plurality of storage resource allocators;
the second of the plurality of storage resource allocators is further configured to allocate internal memory resources to the lower-priority task for the at least a part of tensor data;
after the lower-priority task completes current iterative learning, the first of the plurality of storage resource allocators is configured to release at least a part of the video memory resources occupied by the lower-priority task, wherein the at least a part of tensor data is transferred to an internal memory space and the lower-priority task is executed at least according to the tensor data in the internal memory space.

16. The system according to claim 15, wherein the plurality of storage resource allocators are further configured to send usage status information of the video memory resources of the plurality of machine learning tasks; and
the storage resource coordinator is further configured to send the video memory resource release instruction to the plurality of storage resource allocators if the usage status information satisfies a video memory resource release condition.

17. The system according to claim 16, wherein the plurality of storage resource allocators are further configured to send the usage status information to the storage resource coordinator according to a preset period.

* * * * *